No. 743,131. PATENTED NOV. 3, 1903.
H. ATWATER.
DEVICE FOR REMOVING VEHICLE TIRES.
APPLICATION FILED NOV. 17, 1902.
NO MODEL.
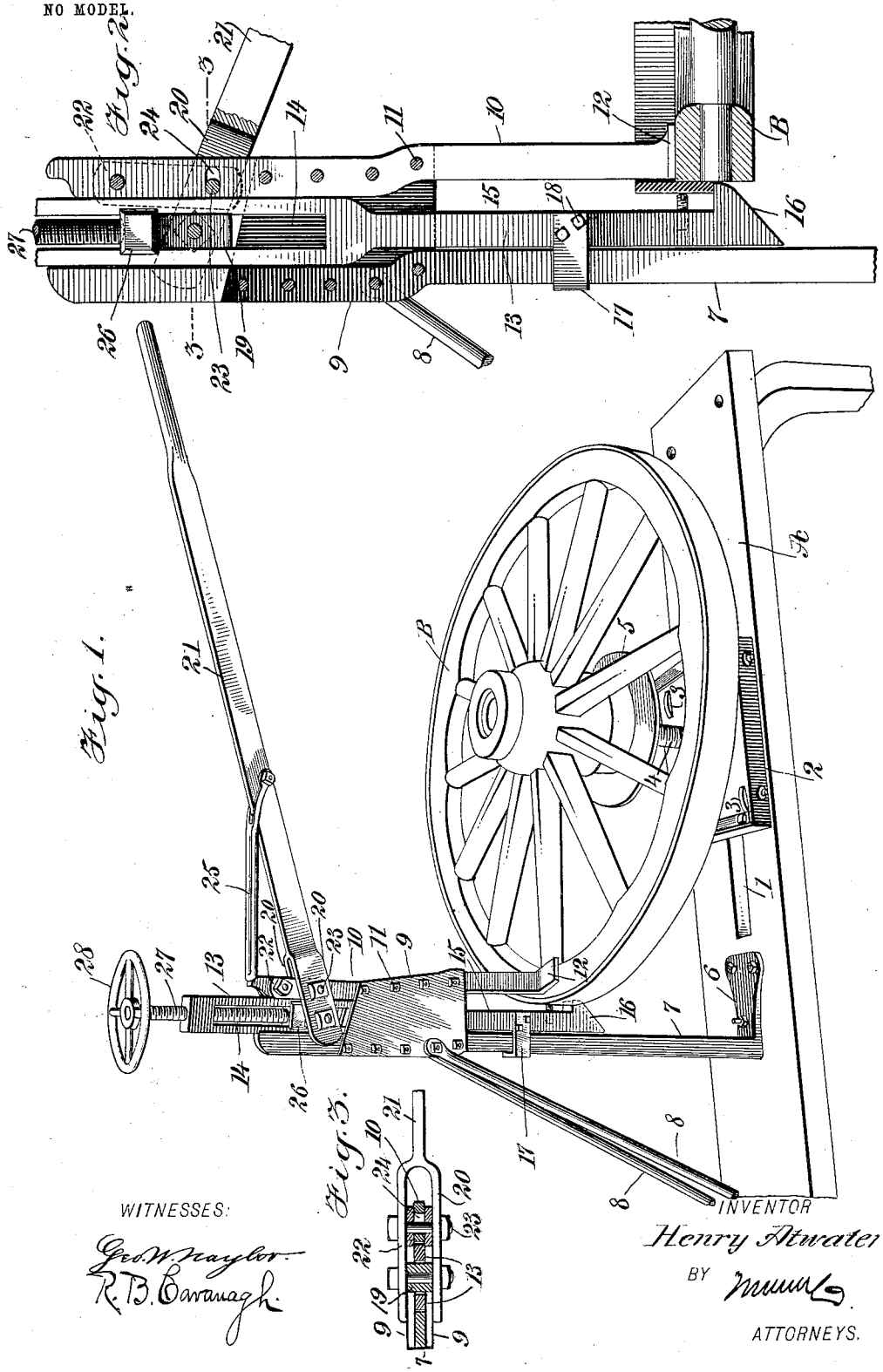
WITNESSES:
Geo. W. Naylor
R. B. Cavanagh
INVENTOR
Henry Atwater
BY
ATTORNEYS.

No. 743,131. Patented November 3, 1903.

UNITED STATES PATENT OFFICE.

HENRY ATWATER, OF VACAVILLE, CALIFORNIA.

DEVICE FOR REMOVING VEHICLE-TIRES.

SPECIFICATION forming part of Letters Patent No. 743,131, dated November 3, 1903.

Application filed November 17, 1902. Serial No. 131,661. (No model.)

*To all whom it may concern:*

Be it known that I, HENRY ATWATER, a citizen of the United States, and a resident of Vacaville, in the county of Solano and State of California, have invented new and useful Improvements in Devices for Removing Vehicle-Tires, of which the following is a full, clear, and exact description.

My invention relates to certain new and useful improvements in devices for removing tires from the rims of vehicle-wheels.

One of the principal objects of the present improvement is to provide a device of the character described which shall be positive and satisfactory in operation—that is to say, one wherein the vehicle-wheel will be tightly and firmly grasped while the tire is being removed therefrom and one wherein the clenching and forcing members or jaws will not be continually slipping or bending under the strain placed thereon.

Heretofore in the construction of tire-removers it has been difficult to combine the assembled features of so mounting a wheel that it can be turned at will and held firmly in any desired adjusted position and at the same time to construct and correlate the parts of the tire-forcing mechanism of the device that the tires may be removed without placing an unnecessary and unbearable strain upon the parts.

Further, it is the purpose of the present invention to provide means whereby the gripping and forcing members of the device may be adjusted to receive a wheel of any size or thickness to remove the tire therefrom.

Another object is to devise a tire-removing mechanism which shall be simple in construction and operation and capable of being manufactured at but comparatively small expense.

With the above-recited ends and others of a like nature in view the invention consists in the peculiar construction, combination, and arrangement of parts, as will be hereinafter described in this specification, illustrated in the accompanying drawings, and set forth in the appended claims.

Although I have herein shown and described one particular embodiment of my invention, it is to be understood that there may be variations in respect to details without departing from the essential features of the improvement.

Reference is to be had to the accompanying drawings, forming a part of this specification, in which similar characters of reference indicate corresponding parts in all the figures.

Figure 1 is a perspective view of a device embodying my improvements. Fig. 2 is a side view, partly in elevation and partly in section, showing the arrangement of the tire-forcing jaws, the side plates of the device being removed and a portion of the wheel-felly and tire being shown in position to be acted upon by said jaws; and Fig. 3 is a transverse sectional view taken on the line 3 3 of Fig. 2.

Referring now to the accompanying drawings, wherein is shown an embodiment of my invention, the letter A designates the framework or table-like base of the device. As will be observed, this base portion is provided with a longitudinal slot 1, which slot permits the block 2 to slide longitudinally on the aforesaid base portion A. This block 2 is provided, if desired, with traction-rollers 3, which permit the aforesaid block to slide more readily and easily over the surface of the base. Extending upwardly through approximately the central portion of the sliding block is the screw-rod 4, supporting at its upper end a horizontally-disposed approximately-circular plate 5, adjustable and revolving on said screw and adapted to form a support for a wheel, as at B, when the tire is to be removed from said wheel. Secured on said base or table portion A adjacent to the longitudinal slot therein by means of the lateral extension 6 is the vertically-arranged standard 7, which for the sake of convenience I will hereinafter term the "main" standard. If desired, this standard may further be supported by brace-rods 8 8, which extend upwardly and are secured one on each side of the aforesaid standard, the bolts securing the said brace-rods also passing through the side plates 9 9. As will be seen, these side plates extend outwardly toward the front of the machine and are approximately parallel with each other, being spaced apart by the width of the post or main standard. Bolted between the forward ends of these plates 9 is the vertically-arranged member 10 of the tire-removing device, the bolts or fastening means 11 holding said member 10 rigidly against movement. The lower extremity of the member 10 is bent laterally approximately at right angles to the main portion of the member to form a shoe portion or extension 12 for a purpose to be hereinafter set forth. Within the space formed by the main standard and the member 10 is adapted to be interposed the sliding member or standard 13, said standard being provided with a longitudinal slot, as at 14, for a portion of its length, the part of the standard below said slotted portion being relatively reduced or narrowed, as at 15, and the end of such reduced or narrowed portion is provided with the engaging hook or extension 16. To guide the aforesaid member 13 when sliding between the main standard and the rigid member 10, I provide suitable retaining-clips, as at 17, which are secured to the sliding member, as shown at 18, and extend around the main standard.

In the slotted portion of the member 13 is slidably mounted a bearing-block 19, adapted to be clasped between the jaws 20 of the bifurcated portion of the lever 21. Said lever 21 is further secured to the rigid member 10 by means of a bolt passing through the jaws of the bifurcated portion and through said rigid member, and a link, as at 22, is pivoted to each side of the rigid member 10 and is secured to the jaws of the bifurcated portion of the lever by a suitable bolt, as shown at 23. This bolt 23 extends through the arms of the bifurcated portion of the lever, the links, and through an enlarged slot 24 in the member 10, which construction will allow the aforesaid lever 21 to have a swinging movement. A pivoted link or rod, as at 25, extends from the lever 21 and is adapted to engage the top of the lever 10 to hold the lever in elevated position when the wheel is being placed on the device. A second block or cross-head guide, as at 26, is slidably mounted in the slotted portion of the member 13 between the block 19 and the top wall of the slot, and a screw-rod, as at 27, extends through the top of the aforesaid member 13 and into the slot 14 and is adapted to bear upon the block 26 to regulate its movement upward in the aforesaid slotted portion of the sliding member 13. This screw-rod 27 is provided with a hand-wheel 28 or other suitable means for adjusting or setting the screw.

From the above description, taken in connection with the drawings, the operation and manner of employing my device will be readily apparent. The hub of the wheel from which the tire is to be removed is placed upon the adjustable pivot-support, with the felly and the tire in substantially the position shown in Fig. 1, with the lever in its raised position, the extension 12 pressing upon the felly of the wheel and the hook portion 16 being in a position to engage with the tire. When the lever is pressed or forced downwardly, the sliding member 13 will be given an upward movement, and the hook portion 16, pulling against the tire, will tend to loosen or force the same from that part of the felly immediately adjacent to the jaws of the machine. The lever is then raised again slightly and the wheel turned around to present another portion of the tire and felly to the action of the device. This is repeated until the entire wheel has made a complete turn, and if the tire has not been completely detached the adjustable screw-rod 27 is turned to force the block 26 downwardly upon the bearing-block 19 of the lever 21, thereby in turn adjusting the hook 16, and the operation above described is repeated until the tire is pulled off the wheel.

The many advantages incident to a device of this character other than those hereinbefore referred to are so numerous that it is unnecessary to enter into detailed description of the same at this time.

Having thus described my invention, I claim as new and desire to secure by Letters Patent—

1. A tire-removing device, comprising a base portion, an adjustable support slidable thereon, a main standard on the base portion, a rim-engaging member rigidly secured to the main standard, a tire-engaging member having a slot in the upper part thereof, and movably interposed between the main standard and the rim-engaging member, a block slidable in said slot, and means above the block and cooperating therewith for regulating the operation of said tire-engaging member.

2. A tire-engaging device, comprising a base portion having a slot therein, an adjustable wheel-support movable in said slot, a main standard on the base portion, a rim-engaging member mounted on said standard and spaced therefrom, a tire-engaging member having a slot in the upper part thereof and movably interposed between the main standard and the rim-engaging member, a block slidable in said slot, and means above said block and cooperating therewith for regulating the operation of the tire-engaging member.

3. A tire-removing device, comprising an adjustable wheel-support, a standard adjacent to said support, laterally-extending plates spaced apart and secured to said standard, a rim-engaging device rigidly supported by said plates, a tire-engaging member movably interposed between the standard and the rim-engaging device, and having a slot in the upper part thereof, means for moving said tire-engaging member, a block in said slot, and means above said block and cooperating therewith for regulating the operation of said tire-engaging member.

4. A tire-removing device, comprising a base portion, an adjustable support slidable thereon, a main standard on the base portion, a rim-engaging member rigidly secured to the main standard, a tire-engaging member having a slot in the upper part thereof and movably interposed between the main standard and the rim-engaging member, a block slidable in said slot, and an operating-lever embracing the same at one end, and an additional block and hand-screw coöperating therewith for regulating the operation of said tire-engaging member.

5. A tire-removing device, comprising a base portion having a slot therein, an adjustable wheel-support movable in said slot, a main standard on said base portion, a rim-engaging member secured to the standard and spaced therefrom, a tire-engaging member movably interposed between the standard and the rim-engaging member, and formed with a slot in the upper part thereof, a block slidable in said slot, an operating-lever embracing said block at one end and having pivotal support on said rim-engaging member, and an additional block and a hand-screw coöperating with said first-named block for regulating the operation of said tire-engaging member.

6. The combination of a main standard, a rigid rim-engaging member, a slotted tire-engaging member movably mounted between the standard and the rigid member, a block adjustable in the slot of the tire-engaging member, a bifurcated lever pivoted to the rigid member and secured to said block, a second block movable in said slot, and a set-screw rod bearing upon the second block, substantially as set forth.

7. The combination of a slotted base portion, and adjustable wheel-supports slidable in the slot of the base portion, a main standard, a rim-engaging member secured to the main standard, a slotted tire-removing member slidably mounted on the standard and interposed between the standard and the rim-engaging member, a bearing-block adjustable in said slot, a bifurcated lever pivotally mounted on the rigid member and secured at its bifurcated portion to said bearing-block, a second block slidable in said slot above the lever-carrying bearing-block, and an adjustable set-screw mounted in said slidable member and bearing upon the second block, the construction being such that a wheel may be held between the rigid member and the slidable member and the tire removed therefrom by actuating the lever and causing the slidable member to move relative to said rigid member.

In testimony whereof I have signed my name to this specification in the presence of two subscribing witnesses.

HENRY ATWATER.

Witnesses:
   C. L. ADSIT,
   FRED. J. VOEL.